(12) United States Patent
Azulay et al.

(10) Patent No.: US 11,743,201 B1
(45) Date of Patent: Aug. 29, 2023

(54) DYNAMIC CLIENT-SERVER ARBITER (71) Applicant: Marvell Israel (M.I.S.L) Ltd., Yokne'am (IL)

(72) Inventors: Yaniv Azulay, Nes Ziona (IL); Ori Goren, Kibbutz Ruchama (IL); Idan Rozenberg, Ra'anana (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 394 days.

(21) Appl. No.: 16/947,584

(22) Filed: Aug. 7, 2020

Related U.S. Application Data (60) Provisional application No. 62/948,009, filed on Dec. 13, 2019.

(51) Int. Cl.
*H04L 47/62* (2022.01)
*H04L 47/625* (2022.01)
*H04L 43/16* (2022.01)
*H04L 47/24* (2022.01)

(52) U.S. Cl.
CPC ............ *H04L 47/6215* (2013.01); *H04L 43/16* (2013.01); *H04L 47/24* (2013.01); *H04L 47/623* (2013.01); *H04L 47/6255* (2013.01)

(58) Field of Classification Search
CPC ...... H04L 47/6215; H04L 43/16; H04L 47/24; H04L 47/6225
See application file for complete search history.

(56) References Cited

U.S. PATENT DOCUMENTS

2021/0263663 A1* 8/2021 Bansal et al. ............ G06N 3/08

FOREIGN PATENT DOCUMENTS

JP         2002354000 A   * 12/2002

* cited by examiner

*Primary Examiner* — Siming Liu (57) ABSTRACT

Electronic apparatus includes functional circuitry configured to respond to requests from a plurality of client devices, data storage circuitry configured as a plurality of client queues in which each respective client queue is configured to store pending requests from a respective client device, priority determination circuitry configured to assign a respective priority level to each respective client queue based at least in part on requests stored in the respective client queues, and arbiter circuitry configured to control access to the functional circuitry by the plurality of client devices. The arbiter circuitry is configured to monitor the priority level of each respective client queue, and control passage of requests from client queues to the functional circuitry based at least in part on a respective priority level assigned to each respective client queue. The priority determination circuitry includes fill level detector circuitry configured to determine a fill level of each client queue.

22 Claims, 5 Drawing Sheets

DYNAMIC CLIENT-SERVER ARBITER

CROSS REFERENCE TO RELATED APPLICATION

This disclosure claims the benefit of copending, commonly-assigned U.S. Provisional Pat. Application No. 62/948,009, filed Dec. 13, 2019, which is hereby incorporated by reference herein in its entirety.

FIELD OF USE

This disclosure relates to arbiters in devices that serve a plurality of client devices. More particularly, this disclosure relates to arbiters that dynamically adjust the priority given to particular clients based on data demand.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A network device, such as a switch or a processor, typically serves a plurality of sources of client requests (typically from other network devices). With multiple client requests potentially arriving at or near the same time, it may be necessary to arbitrate among the client requests so that every request is served fairly and in a timely way. In typical arrangements, the various clients may be served according to a round-robin scheme, in which each client is assigned a time slot and the time slots are served in the same order. In a variation, known as a weighted round-robin scheme, some clients may be given more slots than other clients, based on higher traffic or higher importance. However, such arrangements typically are static, and do not account for changes in client behavior or requirements.

SUMMARY

Electronic apparatus in accordance with implementations of the subject matter of this disclosure includes functional circuitry configured to respond to requests from a plurality of client devices, data storage circuitry configured as a plurality of client queues, each respective client queue in the plurality of client queues being configured to store pending requests from a respective client device in the plurality of client devices, priority determination circuitry configured to assign a respective priority level to each respective client queue in the plurality of client queues based at least in part on requests stored in the respective client queues, and arbiter circuitry configured to control access to the functional circuitry by the plurality of client devices. The arbiter circuitry is configured to monitor the priority level of each respective client queue in the plurality of client queues, and control passage of requests from client queues among the plurality of client queues to the functional circuitry based at least in part on a respective priority level assigned to each respective client queue in the plurality of client queues.

In a first implementation of such electronic apparatus, the priority determination circuitry may include fill level detector circuitry configured to determine a respective fill level of each respective client queue in the plurality of client queues.

In a first instance of the first implementation, the priority determination circuitry may be configured to assign a higher priority to a respective client queue in the plurality of respective client queues when the respective fill level of the respective client queue in the plurality of respective client queues exceeds a threshold.

In a second instance of the first implementation, the arbiter circuitry may be configured to assign one of at least two priority levels to each respective client queue in the plurality of client queues, and the arbiter circuitry is configured to allow passage of requests to the functional circuitry, from client queues having a first priority level of the at least two priority levels, when there is, among the plurality of client queues, at most one client queue having a second priority level, of the at least two priority levels, that is higher than the first priority level.

In a first variant of the second instance of the first implementation, the arbiter circuitry may further be configured to allow passage of requests to the functional circuitry only from client queues having the second priority level of the at least two priority levels, when there are, among the plurality of client queues, at least two client queues having the second priority level.

In a first instance of the first variant of the second instance of the first implementation, the arbiter circuitry may further be configured to allow passage of requests to the functional circuitry, from client queues having the first priority level of the at least two priority levels, after passage of a predetermined time interval following a previous allowance of passage of requests, to the functional circuitry, from client queues having the first priority level of the at least two priority levels.

In that first instance of the first variant of the second instance of the first implementation the arbiter circuitry may be configured to allow passage of requests to the functional circuitry, from client queues having the first priority level of the at least two priority levels, after passage of the predetermined time interval, by masking the second priority level of client queues having the second priority level.

In a second variant of the second instance of the first implementation, the arbiter circuitry may allow requests from the client queues having the first priority level of the at least two priority levels to pass to the functional circuitry according to a first round-robin scheme among the client queues having the first priority level of the at least two priority levels.

In a first instance of the second variant of the second instance of the first implementation, the first round-robin scheme may be a weighted round-robin scheme that is weighted according to traffic in each respective client queue whose requests are allowed to pass to the functional circuitry.

In a first alternative of the first instance of the second variant of the second instance of the first implementation, the first round-robin scheme may be weighted according to importance of traffic in each respective client queue whose requests are allowed to pass to the functional circuitry.

In a second alternative of the first instance of the second variant of the second instance of the first implementation, the first round-robin scheme may be weighted according to volume of traffic in each respective client queue whose requests are allowed to pass to the functional circuitry.

In a second instance of the second variant of the second instance of the first implementation, the arbiter circuitry may be configured to:

when there are at least two client queues having the second priority level, allow requests from the plurality of client queues having the second priority level to pass to the functional circuitry, and when there is at most one client queue having the second priority level, allow requests from client queues at the first priority level to pass to the functional circuitry.

In that second instance of the second variant of the second instance of the first implementation, the arbiter circuitry may be configured to:

when there are at least two client queues having the second priority level, allow requests from the plurality of client queues having the second priority level to pass to the functional circuitry according to a second round-robin scheme, and when there is only one client queue having the second priority level, allow requests from the one client queue having the second priority level to pass to the functional circuitry in a first set of time slots alternating with a second set of time slots, and allow requests from client queues at the first priority level to pass to the functional circuitry in the second set of time slots according to the first round-robin scheme.

A method according to implementations of the subject matter of this disclosure, for responding to requests from client devices of an electronic apparatus, includes receiving requests from a plurality of client devices, storing pending requests from a respective client device in a respective client queue among a plurality of client queues, assigning a respective priority level to each respective client queue based at least in part on requests stored in the respective client queues, monitoring the priority level of each respective client queue in the plurality of client queues, and controlling passage of requests from respective client queues to functional circuitry of the electronic apparatus based at least in part on a respective priority level assigned to each respective client queue in the plurality of client queues.

In a first implementation of a method according the subject matter of this disclosure, the assigning a respective priority level may include determining a respective fill level of each respective client queue in the plurality of client queues.

In an instance of the first implementation, the assigning a respective priority level may include assigning a higher priority to a respective client queue in the plurality of client queues when the respective fill level of the respective client queue in the plurality of client queues exceeds a threshold.

In a second implementation of a method according to the subject matter of this disclosure, the assigning a respective priority level may include assigning one of at least two priority levels to each respective client queue in the plurality of client queues, and the controlling passage of requests may include allowing passage of requests to the functional circuitry, from client queues having a first priority level of the at least two priority levels, when there is, among the plurality of client queues, at most one client queue having a second priority level, of the at least two priority levels, that is higher than the first priority level.

In a first instance of the second implementation, the controlling passage of requests may further include allowing passage of requests to the functional circuitry only from client queues having the second priority level of the at least two priority levels, when there are, among the plurality of client queues, at least two client queues having the second priority level.

In a variant of the first instance of the second implementation, the controlling passage of requests may further include allowing passage of requests to the functional circuitry, from client queues having the first priority level of the at least two priority levels, after passage of a predetermined time interval following a previous allowance of passage of requests, to the functional circuitry, from client queues having the first priority level of the at least two priority levels.

In that variant of the first instance of the second implementation, the controlling passage of requests may include allowing passage of requests to the functional circuitry, from client queues having the first priority level of the at least two priority levels, after passage of the predetermined time interval, by masking the second priority level of client queues having the second priority level.

In a second instance of the second implementation, the controlling passage of requests may include allowing requests from the client queues having the first priority level of the at least two priority levels to pass to the functional circuitry according to a first round-robin scheme among the client queues having the first priority level of the at least two priority levels.

A first variant of that second instance of the second implementation may include weighting the first round-robin scheme according to traffic in each respective client queue whose requests are allowed to pass to the functional circuitry.

In a first form of that first variant of the second instance of the second implementation, the weighting the first round-robin scheme according to traffic in each respective client queue whose requests are allowed to pass to the functional circuitry may include weighting the first round-robin scheme according to importance of traffic in each respective client queue whose requests are allowed to pass to the functional circuitry.

In a second form of that first variant of the second instance of the second implementation, the weighting the first round-robin scheme according to traffic in each respective client queue whose requests are allowed to pass to the functional circuitry may include weighting the first round-robin scheme according to volume of traffic in each respective client queue whose requests are allowed to pass to the functional circuitry.

In a second variant of the second instance of the second implementation, the controlling passage of requests may include:

when there are at least two client queues having the second respective priority level, allowing requests from the plurality of client queues having the second respective priority level to pass to the functional circuitry; and when there are is at most one client queue having the second priority level, allowing requests from all client queues to pass to the functional circuitry.

In that second variant of the second instance of the second implementation, the controlling passage of requests may include:

when there are at least two client queues having the second priority level, allowing requests from the plurality of client queues having the second priority level to pass to the functional circuitry according to a second round-robin scheme; and when there are is one client queue having the second priority level, allowing requests from the one client queue having the second priority level to pass to the functional circuitry in a first set of time slots alternating with a second set of time slots, and allowing requests from client queues at the first priority level to pass to the functional circuitry in the second set of time slots according to the first round-robin scheme.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As described above, typical schemes for allowing a network device to serve requests from multiple clients are static, and fail to account for changes in client behavior, or departure of client behavior from expected patterns. Thus, if a client becomes more active or less active than was expected when the scheme was devised, it is possible either for a client to issue more requests than expected, in which case the client will experience a backlog of unserved requests, or to issue fewer requests than expected, in which case network resources that could be used to serve other clients may be wasted as the serving device sits idle awaiting requests that never arrive.

In addition, in some typical systems, the same client cannot be served in more than one consecutive time slot. Therefore, if a client device is the only device that is active, such a limit on "back-to-back" service of a client will reduce the effective bandwidth to 50%, because every active time slot will alternate with an inactive time slot to meet the back-to-back limit. Even if there are other clients, if a particular client is the most active, and therefore allocated the most time slots, some of those allocated time slots could end up adjacent one another, and therefore some of those adjacent time slots will have to remain inactive, depriving the client of some of the bandwidth allocated to it and reducing the throughput of the system overall.

In accordance with implementations of the subject matter of the present disclosure, an arbiter for a device that serves a plurality of clients adjusts dynamically to the bandwidth demands of the clients, and assures that higher priority clients are allocated more bandwidth than lower priority clients. An arbiter according to implementations of the subject matter of the present disclosure determines whether each client is a low-priority client or a high-priority client and then, based on the relative numbers of low-priority clients and high-priority clients, serves selected clients according to a round-robin scheme, which may be a weighted round-robin scheme.

For example, in some implementations, each client issues requests which are queued up in respective client queue storage. The number of requests may itself be determinative of whether a client is a low-priority client, or a high-priority client. Each respective queue associated with each respective client may be monitored. For example, the fill level of each queue may be monitored, and if the fill level exceeds some threshold, the client associated with that queue is deemed to be a high-priority client. There also could be multiple thresholds, leading to multiple tiers of priority. In addition, there could be other criteria besides fill level for determining priority, such as, for example and without limitation, determining priority based on specific message types, accepting an urgency indication or latency sensitivity indication from the client, or dynamic QoS (quality of service) determination based on client internal states and client inputs.

Considering first a two-priority system, where a client is either a high-priority client or a low-priority client, if there are only low-priority clients, then all clients are served. The clients in such a scenario could be served according to a simple round-robin scheme or a weighted round-robin scheme. In a weighted round-robin scheme, the weights could be determined — either in advance or in real time — according to the traffic in the queue for each client. For example, the weights could be determined based the importance of the client's traffic to the system. Alternatively, the weights could be determined by the amount of traffic generated by the client. That is, even though no client generates enough traffic to exceed the threshold to be considered "high-priority," some clients may nevertheless generate more traffic than other clients and may need to be given more weight in the weighted round-robin scheme.

On the other hand, if there are at least two high-priority clients, then only the high-priority clients are served — again according to a round-robin or weighted round-robin scheme. Here also, in a weighted round-robin scheme, the weights could be determined in advance according to, e.g., the importance of the client in the system, or the weights could be determined by the amount of traffic generated by the client.

The least straightforward case is the case of only one high-priority client and one or more low-priority clients. In such a case, it would not make sense to serve only the high-priority client, because of the back-to-back restriction referred to above. Such a restriction would prevent the high-priority client from being served in every time slot, requiring the system to alternate in successive time slots between serving the high-priority client and serving no client at all, thereby wasting half of the bandwidth of the system if only the high-priority client were being served.

Therefore, according to implementations of the subject matter of this disclosure, in a case where there is only one high-priority client, and at least one low-priority client, the single high-priority client queue is served in a first set of time slots, while all low-priority client queues are served in another set of time slots interleaved with the first set of time slots. For example, the odd time slots (first, third, fifth, etc.) could be dedicated to the high-priority client queue, while the even time slots (second, fourth, sixth, etc.) could be used for all of the low-priority client queues according to a round-robin scheme or a weighted round-robin scheme.

Operation is similar in implementations where there are more than two levels of priority. If there are more than two clients in the highest occupied level of priority, then in such implementations only the client queues in the highest occupied level of priority are served, according to a round-robin scheme or a weighted round-robin scheme. If there is only one client in the highest occupied level of priority, then the client queue of that single higher-priority client is served in a first set of time slots, and the client queues of any clients in the next occupied level of priority below the highest occupied level of priority (which could be the level of priority immediately below the highest occupied level of priority, or could be two or more levels below the highest occupied level of priority) are served in another set of time slots interleaved with the first set of time slots, according to a round-robin scheme or a weighted round-robin scheme.

In some implementations, it may become necessary to temporarily ignore higher priorities to serve lower-priority client queues which, because of high activity rates at the higher-priority levels, have not been served for longer than some predetermined duration. To prevent such "starvation" of lower-priority client queues, after a predetermined duration during which one or more client queues at a lower-priority level have not been served at all, client queues at that lower-priority level are served for a predetermined number of cycles. In some such implementations, each client queue is assigned not only its actual level of priority, but also all priority levels below its actual level of priority, so that it will continue to be served along with the lower-priority client queues during intervals when priority levels are being disregarded to prevent starvation.

If there are more than two levels of priority in a system, then there may be different predetermined intervals for preventing starvation of the different priority levels. The lower the priority, the longer the duration may be. For example, in a three-level system, after a first predetermined duration, client queues of the intermediate-level clients may be served even though there are client queues seeking service at the highest priority level, but the client queues at the lowest level will still not be served. But after a second, longer predetermined duration, even the lowest priority client queues in such a system will be served.

Of course, if a low-level client is very busy, and issues a large number of requests, then in a fill-level-based priority-level determination system as described herein, that low-priority-level client queue will raise its own priority level as unserved requests build up, and will thereby avoid starvation. However, starvation prevention may be implemented so that even low-priority client queues that are not busy enough to raise their own priority level will eventually be served, even when the higher-priority client queues are busy.

According to one implementation of the subject matter of the present disclosure, a number of round-robin arrangements (straight or weighted) corresponding to the number of priority levels are provided. At each priority level, the client queues having that priority are coupled to the respective round-robin arrangement. Each client queue also is coupled to any round-robin arrangement serving lower-priority client queues so that during starvation-prevention operation the higher-priority client queues are served even when the lower-priority client queues are being served, as described above. The respective round-robin arrangement which corresponds to the priority level being served is selected as described below, so that all client queues having that priority level (and also any higher-priority level, during starvation-prevention operations) are served. During the starvation-prevention operation as described above, the system may be prompted to select the lower priority round-robin arrangement even if higher-priority clients are active by masking the high-priority indications of those higher-priority client queues, so that it appears that only lower-priority client queues are active.

The subject matter of this disclosure may be better understood by reference to FIGS. 1-5.

Figure 1:
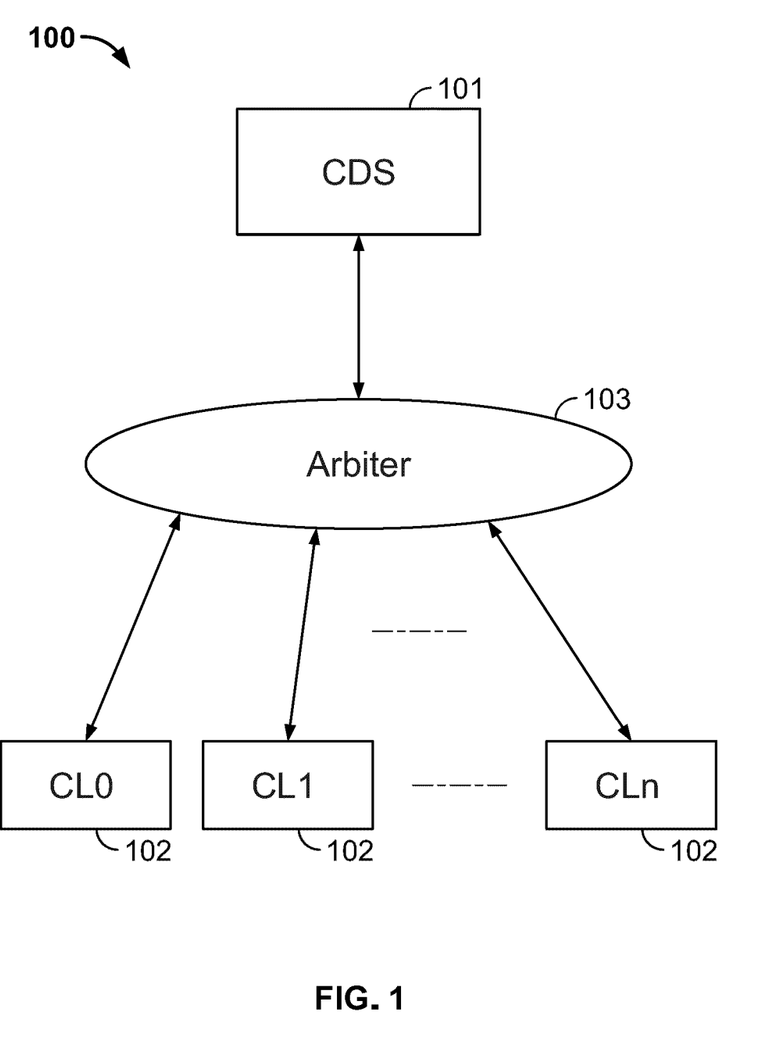
FIG. 1 shows a network architecture in which the subject matter of this disclosure may be used.

FIG. 1 shows a network architecture 100 in which the subject matter of this disclosure may be used. A serving device 101 (which may, e.g., be a central descriptor storage) serves a plurality of clients 102 (CL0, CL1,..., CLn). An arbiter 103 controls access by clients 102 to serving device 101.

Figure 2:
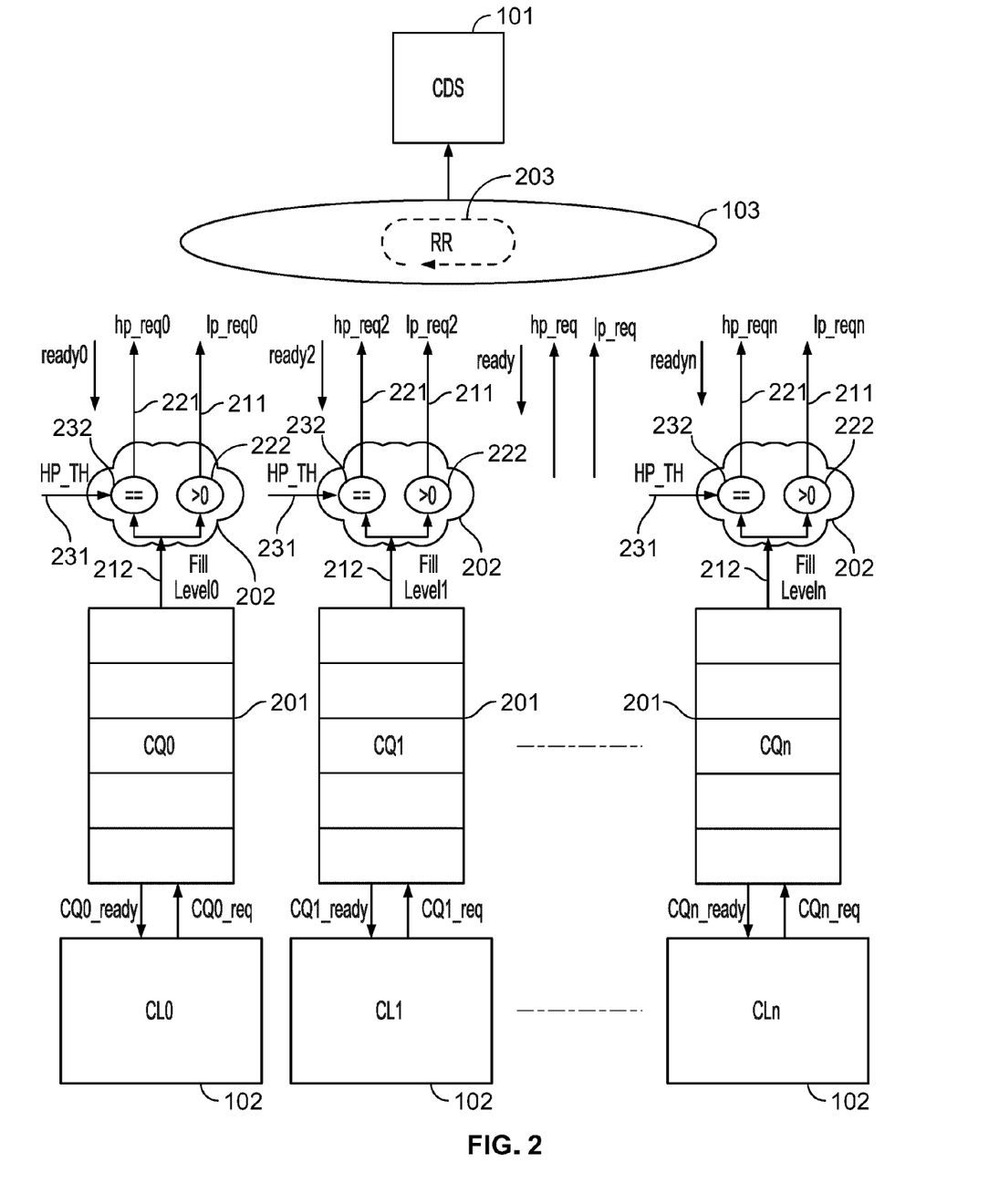
FIG. 2 is a representation of an architecture similar to FIG. 1 and incorporating the subject matter of this disclosure.

As noted above, requests from each of clients 102 are queued up in respective client queues 201 (CQ0, CQ1, ..., CQn), and arbiter 103 controls client access to serving device 101 by controlling access by the various client queues 201, as seen in FIG. 2. In this particular implementation, there are two priority levels. Each client queue 201 has a low-priority request flag 211 and a high-priority request flag 221. Respective priority determination circuitry 202 associated with each respective client queue 201 determines which of flags 211, 221 to assert for its respective client queue 201.

In different implementations, there may be various different criteria for determining priority of a respective one of client queues 201, such as, for example, the importance, to the system, of the function performed by the respective client 102. However, in the implementation shown, the criterion used to determine priority is the respective fill level of each respective client queue 201. To that end, in such an implementation, each respective priority determination circuitry 202 monitors the fill level 212 of its respective client queue 201.

In a fill-level-based priority-determination implementation, if a respective client queue 201 is empty, its respective priority determination circuitry does not assert either the low-priority request flag 211 (lp_reqn) or the high-priority request flag 221 (hp_reqn). However, once fill level 212 is greater than zero, as determined at 222 — meaning there is at least one entry in the queue — then low-priority request flag 211 is asserted. As fill level 212 continues to be monitored, once fill level 212 becomes equal to (and exceeds) high-priority threshold 231 (HP_TH) as determined at 232, then high-priority request flag 221 is asserted.

Although the implementation shown has only two priority levels, there may be implementations with more than two priority levels (whether priority is determined by fill level or otherwise). Therefore, even after high-priority request flag 221 is asserted, fill level 212 may continue to be monitored. In an implementation with more than two priority levels, additional priority levels may be reached as fill level 212 exceeds additional thresholds (not shown), or as other priority-determining criteria are met. In addition, as fill level 212 falls below a previously exceeded threshold, or as other priority-determining indicators decrease, the corresponding priority request flag is deasserted.

If there are more than two priority levels, the two priority indicating flags (low-priority request flag 211 and high-priority request flag 221) may be used in various logical combinations to indicate up to four different priority levels. Alternatively, there may be more than two priority-indicating flags. For example, in the implementation shown, as described above, and again below, two flags cannot be used for more than two priority levels, because as a higher priority request flag is asserted, any lower priority request flag that has been asserted is not deasserted (unless the queue becomes empty) in this implementation, because when arbiter 103 grants server access to lower-priority client queues, it includes, in at least some cases (e.g., during starvation-prevention operation), the higher-priority client queues as well.

In a two-priority-level system, arbiter 103 grants server access to the various client queues according to the following rules, as previously described:

1. If there are no client queues 201 with high-priority request flag 221 asserted, and there are at least two client queues 201 with low-priority request flag 211 asserted, then access is granted to the client queues 201 with low-priority request flag 211 asserted, according to round-robin scheme 203.
2. If there are two or more active client queues 201 with high-priority request flag 221 asserted, then access is granted only to the client queues 201 with high-priority request flag 221 asserted, according to round-robin scheme 203, regardless of whether there are any active client queues 201 with low-priority request flag 211 asserted.
3. If there is only one active client queue 201 of any priority level, then that single active client queue 201 is granted access in every other time slot.
4. If there is only one active client queue 201 with high-priority request flag 221 asserted, and there is at least one active client queue 201 with a low-priority request flag asserted, then access is granted in a first set of alternating time slots (e.g., the first, third, fifth, etc., time slots) to the active client queue 201 with high-priority request flag 221 asserted, and in a second set of alternating time slots (e.g., the second, fourth, sixth, etc., time slots) to the active client queue or queues 201 with low-priority request flag 211 asserted, according to round-robin scheme 203.

Round-robin scheme 203 may be a straight round-robin scheme. Alternatively, insofar as even among all high-priority clients or all low-priority clients, there may be clients with higher or lower traffic demands, round-robin scheme 203 may be a weighted round-robin scheme. If round-robin scheme 203 is weighted, the weights could be assigned in advance according to expected traffic demand, or could be assigned dynamically according to actual traffic demand as determined according to, for example, fill level 212 of each queue 201. Dynamic assignment is more efficient, because actual traffic may not match up with expected traffic, so that predetermined assignment may result in clients with higher-than-expected traffic having to wait, or slots pre-assigned to clients with lower-than-expected traffic sitting unused.

Figure 3:
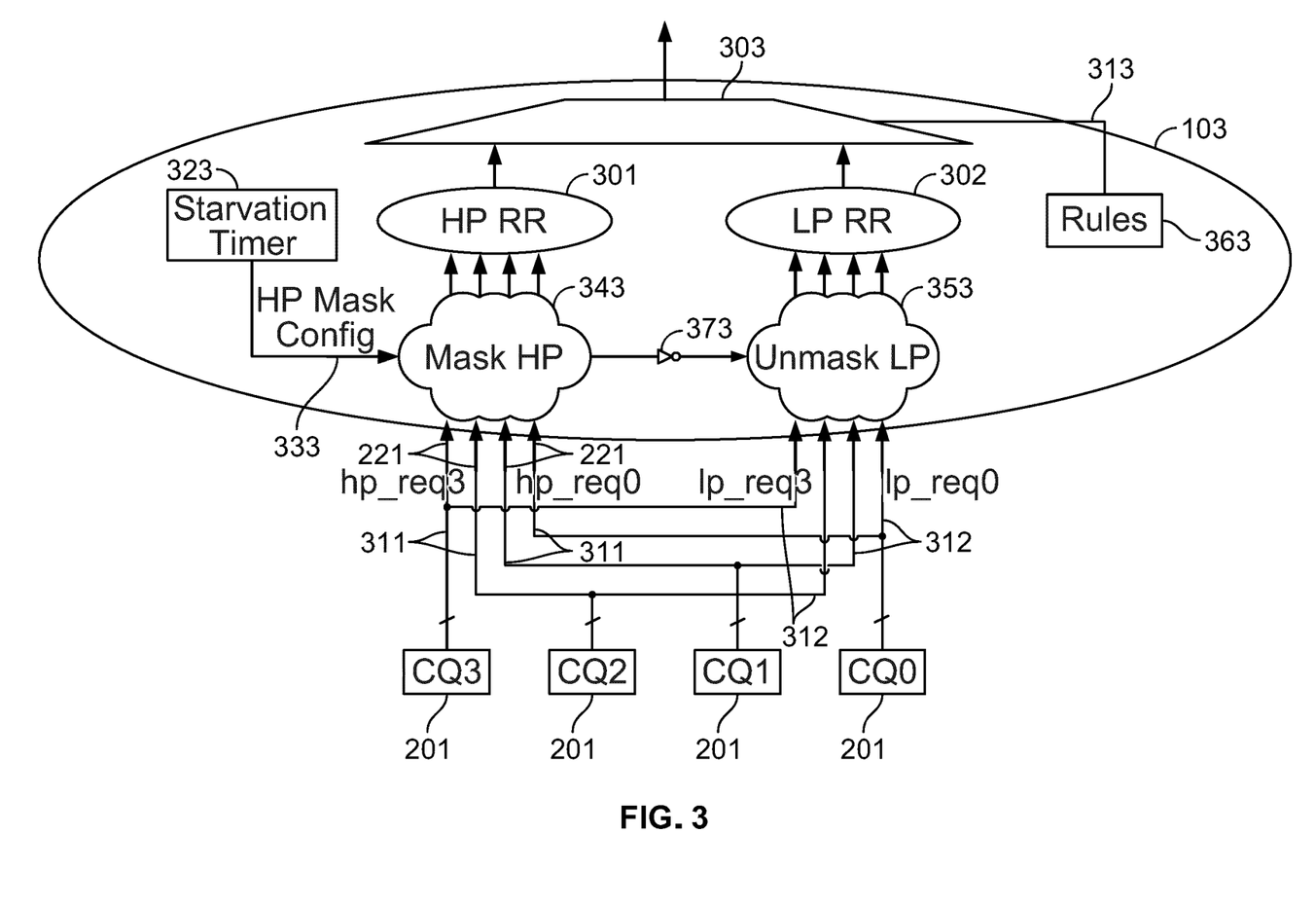
FIG. 3 shows a portion of the architecture of FIG. 2 according to an implementation of the subject matter of this disclosure.

In the implementation of FIG. 3, round-robin scheme 203 is a plurality of separate round-robin schemes 301 (high-priority) and 302 (low-priority) for client queues 201 of different priority levels. Multiplexer 303 of arbiter 103 selects between (or among if there more than two) the round-robin schemes 301, 302, based on a selection signal 313 generated by monitoring how many client queues 201 fall into each priority level, according to the rules set forth above, as implemented in Rules Engine 363.

In the illustration in FIG. 3, there are four client queues 201 (0,...,3). Although inputs from all client queues 201 to both separate round-robin schemes 301, 302 are shown, at any given time not all client queues 201 will have active inputs to both separate round-robin schemes 301, 302. However, each active high-priority client queue input 311 (similar to high-priority request flag 221) will also be an active low-priority client queue input 312 (similar to low-priority request flag 211), to facilitate the starvation prevention operation described above, except that in a case of only one high-priority client queue 201, low-priority round-robin scheme will be configured to ignore the input 312 from the high-priority client queue 201, in accordance with Rule 4, above.

In a two-priority-level implementation, the only one of the four situations covered by the four rules set forth above in which starvation is possible is the situation covered by Rule 2, because that is the only situation in which there are active low-priority client queues that are not served as long as there are active high-priority client queues to be served. Therefore, a starvation timer 323 in arbiter 103 is provided. If, in such a situation (whether covered by Rule 2, or any other situation in which active low-priority client queues are not otherwise being served), more than a configurable predetermined duration passes during which no low-priority client queues are served, starvation timer 323 will assert high-priority mask configuration signal 333, which will, for a predetermined, configurable interval, at 343, mask the high-priority flags 221 so that it appears that there are no high-priority client queues to be served. This will allow low-priority client queues to be served by low-priority round-robin scheme 302. As noted above, each active high-priority client queue input 311 will also be an active low-priority client queue input 312, but will be masked unless the starvation prevention mode is triggered. Therefore, at the same time that high-priority mask configuration signal 333 masks high-priority request flags 221, high-priority mask configuration signal 333 will, at 353 (after inversion at 373), unmask the low-priority request flag 211 corresponding to any active high-priority client queue, so that that active high-priority client queue is served, along with all of the active low-priority client queues, according to low-priority round-robin scheme 302.

As noted above, if there are more than two levels of priority in a system, then there may be different predetermined intervals for preventing starvation of the different priority levels. The lower the priority, the longer the duration may be. For example, in one implementation, in a three-level system, after a first predetermined duration, the intermediate-level client queues may be served even though there are client queues seeking service at the highest priority level, but the client queues at the lowest level will still not be served. But after a second, longer predetermined duration, even the lowest priority client queues will be served. In such an implementation, more than one mask configuration signal would be used. After the first predetermined duration, a first mask configuration signal that masked the high-priority flags of the highest-priority client queues and unmasked the intermediate-priority flags of the highest priority client queues, without affecting the priority flags of the intermediate-priority client queues, would be asserted. But after the second predetermined duration, a second mask configuration signal that masked the high-priority flags of the highest-priority client queues and the intermediate-priority flags of both the high-priority and intermediate-priority client queues and unmasked the low-priority flags of the both the high-priority and intermediate-priority client queues, would be asserted, so that the low-priority client queues can be served, along with the high-priority and intermediate-priority client queues, by a third round-robin scheme (not shown).

Figure 4:
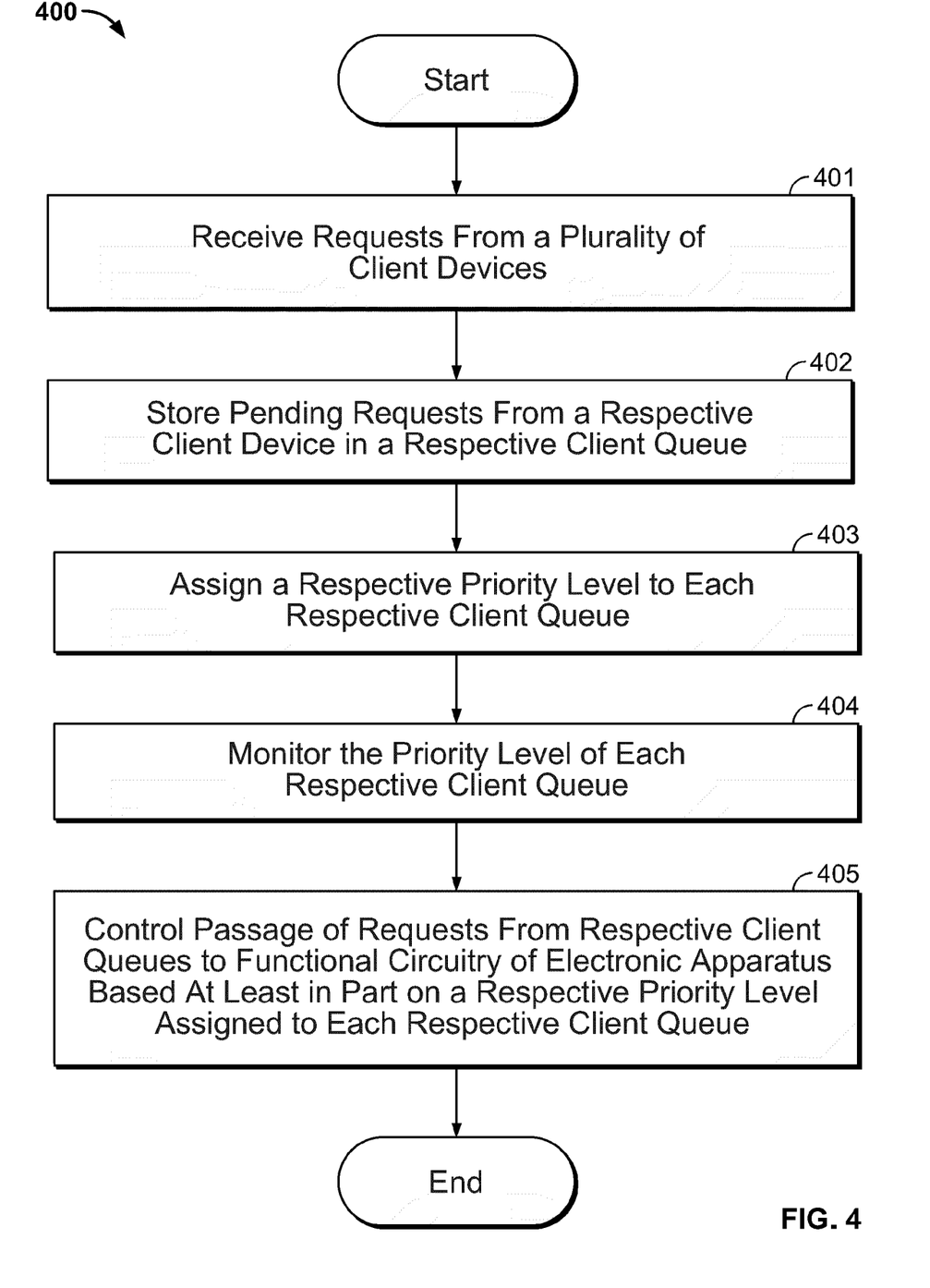
FIG. 4 is a flow diagram illustrating a method according to implementations of the subject matter of this disclosure.

An arbitration method 400 according to implementations of the subject matter of this disclosure, for responding to requests from client devices, is diagrammed in FIG. 4.

Method 400 begins at 401 where requests are received from a plurality of client devices. At 402, pending requests from each respective client device are stored in a respective client queue. At 403, a respective priority level is assigned to each respective client queue, according to fill level or other criterion, as described above. At 404, the priority level of each respective client queue is monitored (because the priority level may change as the criterion on which the priority level is based also changes). At 405, passage of requests from respective client queues to functional circuitry of the electronic apparatus is controlled based at least in part on a respective priority level assigned to each respective client queue, and method 400 ends.

Figure 5:
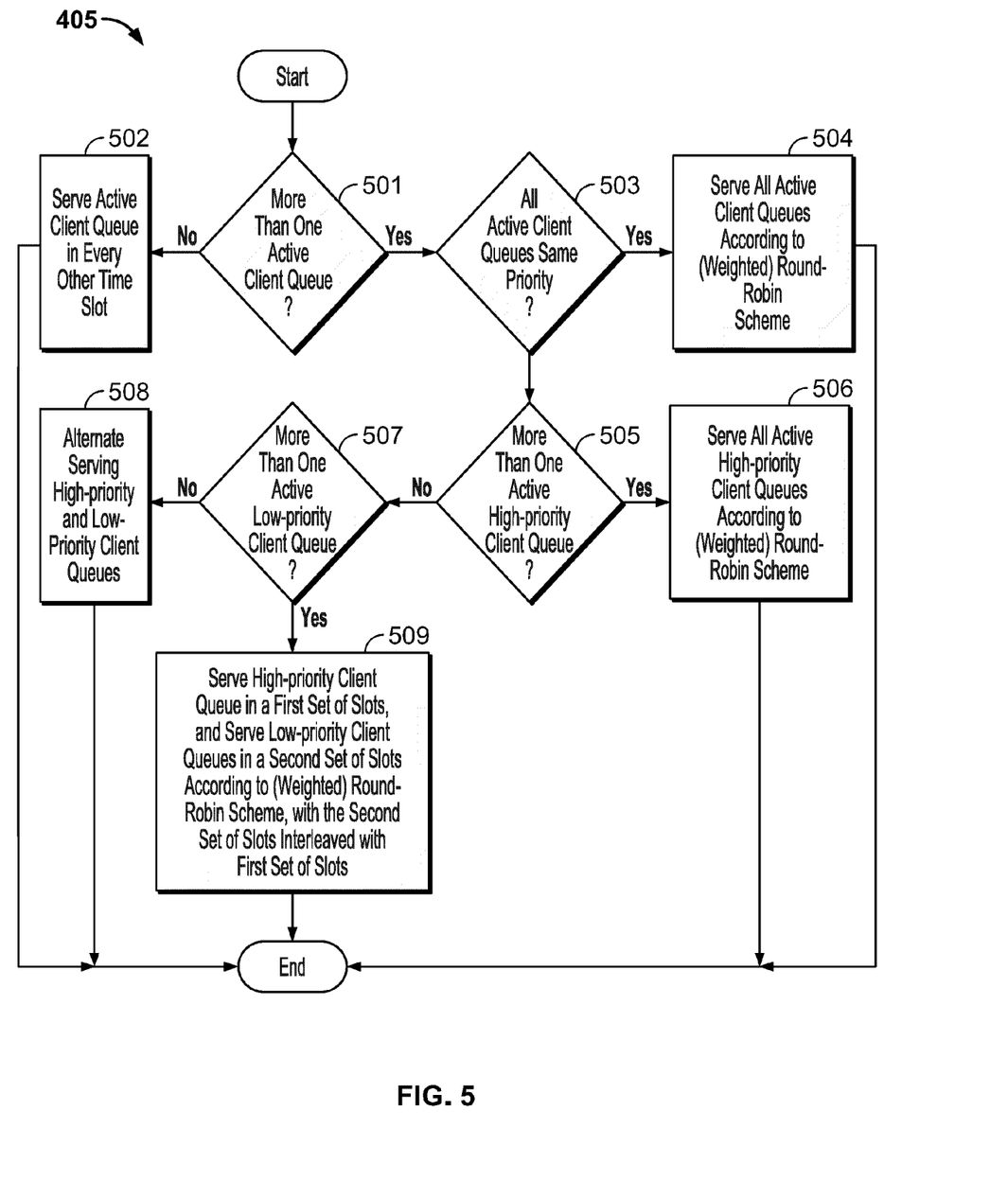
FIG. 5 is a flow diagram illustrating an implementation of a portion of the method of FIG. 4 according to the subject matter of this disclosure.

One possible implementation of controlling 405 is shown in FIG. 5 where, at 501, it is determined whether there is more than one active client queue. If not, then at 502 the one active client queue is served in every other time slot (in view of the "back-to-back" restriction described above), and controlling 405 ends. If at 501 it is determined that there is more than one active client queue, then at 503, it is determined whether all active client queues have the same priority level. If so, then at 504 all active client queues are served according to a round-robin scheme, which may be weighted as described above, or not weighted, and controlling 405 ends. If at 503 it is determined that all active client queues do not have the same priority level, meaning there is at least one low-priority client queue and at least one high-priority client queue, then at 505, it is determined whether there is more than one active high-priority client queue. If so, then at 506 all high-priority client queues are served according to a round-robin scheme, which may be weighted as described above, or not weighted, while the low-priority client queues are not served, and controlling 405 ends.

If at 505 it is determined there is not more than one active high-priority client queue, then at 507 it is determined whether there is more than one active low-priority client queue. If not, that means that there is one active high-priority client queue and one active low-priority client queue, and at 508 the one active high-priority client queue and the one active low-priority client queue are served alternately.

If at 507 it is determined that there is more than one active low-priority client queue, that means that there is one active high-priority client queue and a plurality of active low-priority client queues, and at 509 the active high-priority client queue is served in one set of slots, while the active low-priority client queues are served in a second set of slots according to a round-robin scheme, which may be weighted as described above, or not weighted. The first set of slots is interleaved with the second set of slots. For example, the first set of slots may be the odd slots (first slot, third slot, fifth slot, etc.), in which case the second set of slots would be the even slots (second slot, fourth slot, sixth slot, etc.). Controlling 405 ends after 509.

Thus it is seen that apparatus (including an arbiter), and corresponding method, for dynamically adjusting the priority given to particular clients based on data demand, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:
1. An electronic apparatus comprising:
functional circuitry configured to respond to requests from a plurality of client devices;
data storage circuitry configured as a plurality of client queues, each respective client queue in the plurality of client queues being configured to store pending requests from a respective client device in the plurality of client devices;
priority determination circuitry configured to assign a respective priority level, from among at least two priority levels, to each respective client queue in the plurality of client queues based at least in part on requests stored in the respective client queues, a second priority level of the at least two priority levels being higher than a first priority level of the at least two priority levels; and
arbiter circuitry configured to control access to the functional circuitry by the plurality of client devices, the arbiter circuitry being configured to:
monitor the priority level of each respective client queue in the plurality of client queues,
control passage of requests from client queues among the plurality of client queues to the functional circuitry based at least in part on a respective priority level assigned to each respective client queue in the plurality of client queues; and
allow passage of requests to the functional circuitry only from client queues having the second priority level of the at least two priority levels, when there are, among the plurality of client queues, at least two client queues having the second priority level.

2. The electronic apparatus of claim 1, wherein the priority determination circuitry comprises fill level detector circuitry configured to determine a respective fill level of each respective client queue in the plurality of client queues.

3. The electronic apparatus of claim 2, wherein the priority determination circuitry is configured to assign a higher priority to a respective client queue in the plurality of respective client queues when the respective fill level of the respective client queue in the plurality of respective client queues exceeds a threshold.

4. The electronic apparatus of claim 1, wherein:
the arbiter circuitry is configured to allow passage of requests to the functional circuitry, from client queues having a first priority level of the at least two priority levels, when there is, among the plurality of client queues, at most one client queue having the second priority level, of the at least two priority levels, that is higher than the first priority level.

5. The electronic apparatus of claim 4, wherein the arbiter circuitry is further configured to allow passage of requests to the functional circuitry, from client queues having the first priority level of the at least two priority levels, after passage of a predetermined time interval following a previous allowance of passage of requests, to the functional circuitry, from client queues having the first priority level of the at least two priority levels.

6. The electronic apparatus of claim 5, wherein the arbiter circuitry is configured to allow passage of requests to the functional circuitry, from client queues having the first priority level of the at least two priority levels, after passage of the predetermined time interval, by masking the second priority level of client queues having the second priority level.

7. The electronic apparatus of claim 4, wherein the arbiter circuitry allows requests from the client queues having the first priority level of the at least two priority levels to pass to the functional circuitry according to a first round-robin scheme among the client queues having the first priority level of the at least two priority levels.

8. The electronic apparatus of claim 7 wherein the first round-robin scheme is a weighted round-robin scheme that is weighted according to traffic in each respective client queue whose requests are allowed to pass to the functional circuitry.

9. The electronic apparatus of claim 8 wherein the first round-robin scheme is weighted according to importance of traffic in each respective client queue whose requests are allowed to pass to the functional circuitry.

10. The electronic apparatus of claim 8 wherein the first round-robin scheme is weighted according to volume of traffic in each respective client queue whose requests are allowed to pass to the functional circuitry.

11. The electronic apparatus of claim 7 wherein the arbiter circuitry is configured to:
when there are at least two client queues having the second priority level, allow requests from the plurality of client queues having the second priority level to pass to the functional circuitry according to a second round-robin scheme; and
when there is only one client queue having the second priority level, allow requests from the one client queue having the second priority level to pass to the functional circuitry in a first set of time slots alternating with a second set of time slots, and allow requests from client queues at the first priority level to pass to the functional circuitry in the second set of time slots according to the first round-robin scheme.

12. A method of responding to requests from client devices of an electronic apparatus comprising:
receiving requests from a plurality of client devices;
storing pending requests from a respective client device in a respective client queue among a plurality of client queues;
assigning a respective priority level from among at least two priority levels to each respective client queue based at least in part on requests stored in the respective client queues, a second priority level of the at least two priority levels being higher than a first priority level of the at least two priority levels;
monitoring the priority level of each respective client queue in the plurality of client queues; and
controlling passage of requests from respective client queues to functional circuitry of the electronic apparatus based at least in part on a respective priority level assigned to each respective client queue in the plurality of client queues, including allowing passage of requests to the functional circuitry only from client queues having the second priority level of the at least two priority levels, when there are, among the plurality of client queues, at least two client queues having the second priority level.

13. The method of claim 12, wherein the assigning a respective priority level comprises determining a respective fill level of each respective client queue in the plurality of client queues.

14. The method of claim 13, wherein the assigning a respective priority level comprises assigning a higher priority to a respective client queue in the plurality of client queues when the respective fill level of the respective client queue in the plurality of client queues exceeds a threshold.

15. The method of claim 12, wherein:
the controlling passage of requests comprises allowing passage of requests to the functional circuitry, from client queues having a first priority level of the at least two priority levels, when there is, among the plurality of client queues, at most one client queue having the second priority level, of the at least two priority levels, that is higher than the first priority level.

16. The method of claim 15, wherein the controlling passage of requests further comprises allowing passage of requests to the functional circuitry, from client queues having the first priority level of the at least two priority levels, after passage of a predetermined time interval following a previous allowance of passage of requests, to the functional circuitry, from client queues having the first priority level of the at least two priority levels.

17. The method of claim 16, wherein the controlling passage of requests comprises allowing passage of requests to the functional circuitry, from client queues having the first priority level of the at least two priority levels, after passage of the predetermined time interval, by masking the second priority level of client queues having the second priority level.

18. The method of claim 15, wherein the controlling passage of requests comprises allowing requests from the client queues having the first priority level of the at least two priority levels to pass to the functional circuitry according to a first round-robin scheme among the client queues having the first priority level of the at least two priority levels.

19. The method of claim 18 comprising weighting the first round-robin scheme according to traffic in each respective client queue whose requests are allowed to pass to the functional circuitry.

20. The method of claim 19 wherein the weighting the first round-robin scheme according to traffic in each respective client queue whose requests are allowed to pass to the functional circuitry comprises weighting the first round-robin scheme according to importance of traffic in each respective client queue whose requests are allowed to pass to the functional circuitry.

21. The method of claim 19 wherein the weighting the first round-robin scheme according to traffic in each respective client queue whose requests are allowed to pass to the functional circuitry comprises weighting the first round-robin scheme according to volume of traffic in each respective client queue whose requests are allowed to pass to the functional circuitry.

22. The method of claim 18 wherein the controlling passage of requests comprises:
when there are at least two client queues having the second priority level, allowing requests from the plurality of client queues having the second priority level to pass to the functional circuitry according to a second round-robin scheme; and
when there are is one client queue having the second priority level, allowing requests from the one client queue having the second priority level to pass to the functional circuitry in a first set of time slots alternating with a second set of time slots, and allowing requests from client queues at the first priority level to pass to the functional circuitry in the second set of time slots according to the first round-robin scheme.

* * * * *